United States Patent
Cui

(10) Patent No.: US 10,549,963 B2
(45) Date of Patent: Feb. 4, 2020

(54) AUTOMATIC CLUTCH WINCH

(71) Applicant: Ningbo Lianda Winch Co., Ltd., Ningbo (CN)

(72) Inventor: Xiaojun Cui, Ningbo (CN)

( * ) Notice: Subject to any disclaimer, the term of this patent is extended or adjusted under 35 U.S.C. 154(b) by 58 days.

(21) Appl. No.: 16/008,171

(22) Filed: Jun. 14, 2018

(65) Prior Publication Data
US 2019/0300342 A1 Oct. 3, 2019

(30) Foreign Application Priority Data
Mar. 30, 2018 (CN) .......................... 2018 1 0294006

(51) Int. Cl.
| | |
|---|---|
| *B66D 1/22* | (2006.01) |
| *B66D 1/16* | (2006.01) |
| *F16H 57/02* | (2012.01) |
| *F16H 1/28* | (2006.01) |
| *F16H 57/08* | (2006.01) |
| *B66D 1/12* | (2006.01) |
| *F16H 55/17* | (2006.01) |
| *F16D 11/14* | (2006.01) |

(52) U.S. Cl.
CPC ............... *B66D 1/22* (2013.01); *B66D 1/12* (2013.01); *F16H 1/28* (2013.01); *F16H 55/17* (2013.01); *F16H 57/02* (2013.01); *F16H 57/08* (2013.01); *F16D 11/14* (2013.01); *F16H 2055/176* (2013.01); *F16H 2057/02034* (2013.01); *F16H 2057/02082* (2013.01)

(58) Field of Classification Search
CPC .... B66D 1/12; B66D 1/16; B66D 1/22; F16H 1/28; F16H 55/17; F16H 57/02; F16H 57/08; F16H 2055/176; F16H 2057/02034; F16H 2057/02082; F16D 11/14

See application file for complete search history.

(56) References Cited

U.S. PATENT DOCUMENTS

| | | | | |
|---|---|---|---|---|
| 7,270,312 | B1 * | 9/2007 | Phipps ..................... | B66D 1/22 |
| | | | | 254/278 |
| 7,891,641 | B1 * | 2/2011 | Miller ..................... | B66D 1/16 |
| | | | | 254/344 |
| 7,984,894 | B1 * | 7/2011 | Chauza ..................... | B66D 1/16 |
| | | | | 254/344 |
| 8,434,742 | B2 * | 5/2013 | Akhavein .............. | B66D 3/006 |
| | | | | 254/344 |
| 9,359,045 | B2 * | 6/2016 | Nam ........................ | B66D 1/14 |
| 10,280,050 | B2 * | 5/2019 | Cui ........................ | B66D 1/225 |
| 10,377,608 | B2 * | 8/2019 | Cui ........................ | B60D 1/185 |
| 2010/0065799 | A1 * | 3/2010 | Zhou ........................ | B66D 1/22 |
| | | | | 254/344 |

(Continued)

*Primary Examiner* — Michael E Gallion
(74) *Attorney, Agent, or Firm* — W&K IP

(57) ABSTRACT

The present disclosure discloses an automatic clutch winch comprising a motor, a gear reduction unit actuated by the motor, and a winding drum drivably coupled with the gear reduction unit. The gear reduction unit comprises a planetary gear assembly drivably coupled with the winding drum, a movable ring gear engaging with the planetary gear assembly, a DC gear motor, a cam driven by the DC gear motor to rotate, and a pull rod driven by the cam. The pull rod is driven by the cam on a first end to enter or exit a notch of a plurality of notches in the movable ring gear. The disclosed automatic clutch winch can provide protection for the internal components during an emergent situation.

10 Claims, 7 Drawing Sheets

(56) References Cited

U.S. PATENT DOCUMENTS

| | | | |
|---|---|---|---|
| 2014/0367216 A1* | 12/2014 | Raszkowski | F16D 11/14 192/69.8 |
| 2016/0068376 A1* | 3/2016 | Fretz | B66D 3/00 254/219 |
| 2018/0118533 A1* | 5/2018 | Karambelas | B66D 1/48 |
| 2018/0201486 A1* | 7/2018 | Huang | B66D 1/14 |
| 2019/0002254 A1* | 1/2019 | Dennis | B66D 1/22 |

* cited by examiner

AUTOMATIC CLUTCH WINCH

CROSS-REFERENCE TO RELATED APPLICATIONS

This application claims priority to Chinese Patent Application No. 201810294006.2 with a filing date of Mar. 30, 2018. The content of the aforementioned applications, including any intervening amendments thereto, are incorporated herein by reference.

TECHNICAL FIELD

The present disclosure relates to the field of winches, and more particularly, to an automatic clutch winch.

BACKGROUND OF THE PRESENT INVENTION

Winches are devices mounted on vehicles that can be used for traction and is mainly used for rescue of vehicles in harsh environments. When a vehicle gets stuck in mud or similar rough terrain and has difficulty in landing on four wheels, the winch can be fixed to objects in the surrounding environment to pull out the vehicle. Winches can also be applied to tow large obstacles such as logs. Existing electric winches are mainly composed of a motor, a transmission shaft, a gear reduction box, a winding drum and the like. The gear reduction box connects the power between the motor and the winding drum, so that a steel rope wound on the winding drum can produce a traction force to the vehicle. In prior arts, the winch needs to be manually operated to perform various operations, and it is not yet possible to achieve a full-automatic operation through using a single button or remote control. Such a winch would not be convenient for the user. Because winches are generally used in harsh driving environments or accidents, the requirements for ease of use and reliability are higher. In emergencies it may be necessary to immediately stop or start the winch. It is necessary to provide a reliable automatic clutch device to control the coupling of the drive motor with the winding drum in a robust manner.

When the winch retracts the steel rope wound on the winding drum, the motor will work at a relatively high power in the range of 1-2 KW to drive the winding drum. At this time, if the rope is cross-wound on the winding drum due to sudden changes in the direction of the external force, mechanical damage may be caused to the winch, and besides, usage next would be greatly impeded. The user's manual readjustment of the cross-wound steel rope is both laborious and dangerous. There is a need for a more efficient mechanism that automatically adjusts the retraction of the steel rope so that it can be neatly wound around the winding drum.

In addition, existing electric winches generally have a control unit, part of the transmission mechanisms, a power supply, and a handle mounted above the winch, so the winch will consume a lot of space when installed in front of a vehicle. If these parts can be reduced in size and accommodated in the interior of the winch, it will be possible to reduce the space occupied by winch and provide more preferable visual effects. In addition, an existing electric winch generally installs a control unit, part of the transmission mechanisms, a power supply, and a handle above the winch, so the winch will consume a lot of space when installed in front of a vehicle. If these parts can be reduced in size and accommodated in the interior of the winch, it will be possible to reduce the space occupied by winch and provide preferable visual effects. There is also a need for a winch with more compact structures.

SUMMARY OF PRESENT INVENTION

One objective of the present disclosure is to solve problems of the prior arts by providing an automatic clutch winch comprising a motor, a gear reduction unit actuated by the motor, and a winding drum drivably coupled with the gear reduction unit. The gear reduction unit comprises a planetary gear assembly drivably coupled with the winding drum, a movable ring gear engaging with the planetary gear assembly, a direct current (DC) gear motor, a cam driven by the DC gear motor to rotate, and a pull rod driven by the cam. The pull rod is driven by the cam on a first end to enter or exit a notch of a plurality of notches in the movable ring gear, and the movable ring gear is drivingly coupled with the motor when the first end enters the notch, and decoupled from the motor when the first end exits the notch.

In some embodiments, the pull rod is connected to a spring at a second end of the pull rod opposite the first end, the spring providing an elastic force for retaining the first end in the notch when the first end enters the notch in the movable ring gear.

In some embodiments, the pull rod includes a protrusion that contacts the cam.

In some embodiments, the movable ring gear includes a plurality of notches having the same pitch in the circumferential direction.

In some embodiments, the movable ring gear and said planetary gear assembly are mounted within a gearbox housing, the gearbox housing including a pull rod access port for the pull rod to enter or exit the movable ring gear.

In some embodiments, the DC gear motor is mounted outside the gearbox housing.

In some embodiments, the winch further comprises a gearbox cover for receiving the DC gear motor.

In some embodiments, the winch further comprises a control unit disposed on a side of the motor and electrically coupled with the motor.

In some embodiments, the DC gear motor is electrically coupled to the control unit.

In some embodiments, the motor is mounted on a motor support, the gear reduction unit is mounted on a gear reduction unit support symmetrical to the motor support, and the winding drum is mounted between the motor support and the gear reduction unit support.

The winch according to the above embodiments utilizes the DC gear motor to control the rotation of the cam and control the entering and exiting of the pull rod, and therefore controls the gear of the gear reduction unit to drivingly couple with or decouple from the motor. The automatic clutch of the winch according to the embodiments can eliminate the need for manual operation firstly. Secondly, because the DC gear motors and the cam are individually protected by the gearbox housing and the gearbox covers, and separated from the gear reduction unit, it is less likely to induce failures. When clutching, the pull rod needs to be moved only a small displacement away from the movable ring gear for the winding drum to lose its driving force, without having to interfere the gear reduction unit. This could contribute to protection of the gear reduction unit and other components from damage during an emergency stop of the winch.

Further, existing electric winches generally have the control unit, a part of the transmission mechanisms, the power supply, and the handle mounted above the winch, so that the winch would take up a lot of space when mounted in front of the vehicle. If these parts can be reduced in size and accommodated inside the winch, the space occupied by the winch would be reduced, and a visually pleasing effect can be realized. There is also a need for a winch with more compact structures.

DESCRIPTION OF THE DRAWINGS

The present invention is illustrated by way of example and not limitation in the figures of the accompanying drawings, in which like references indicate similar elements, and in which.

REFERENCE NUMBERS

101 bottom plate, 102 first side support, 103 motor support, 104 winding drum gear combination, 105 gear reduction unit support, 106 transmission gear, 107 second side support, 108 gear shaft, 109 gear casing, 110 gearbox housing, 111 reciprocating screw rod slider, 112 slider guide, 113 reciprocating screw rod, 114 gearbox gear, 201 winding drum, 202 control unit, 203 motor, 204 gear reduction unit, 205 transmission gear unit, 401 DC gear motor, 402 gearbox cover, 403 pull rod spring, 404 pull rod, 405 pull rod positioning block, 406 pull rod guide sleeve, 407 cam, 408 gearbox housing, 409 movable ring gear, 410 planetary gear assembly.

DETAILED DESCRIPTION OF PREFERRED EMBODIMENTS

Various aspects of the illustrative embodiments will be described using terms used by those commonly skilled in the art to convey the substance of their work to other. However, it will be apparent to the skilled in the art that alternate embodiments may be practices with only some of the described aspects. For purposes of explanation, specific number, materials, and configurations are set forth in order to provide a thorough understanding of the illustrative embodiments. However, it will be apparent to one skilled in the art that alternate embodiments may be practices without the specific details. In other instances, well-known features are omitted or simplified in order not to obscure the illustrative embodiments.

Although the terms first, second, third, left, right, upper, lower, etc. may be used herein to describe various elements, these elements should not be limited by these terms. These terms are only used to distinguish one element from another. Terms such as "first," "second," and other numerical terms when used herein do not imply a sequence or order unless clearly indicated by the context. Thus, a first element could be termed a second element, and a left component could be termed a right component without departing from the teachings of the example embodiments. In addition, the term "and/or" may mean "and", "or", "exclusive-or", "one", "some, but not all", "neither", or "both", although the scope of the claimed subject matter is not limited in this respect. In the following description and/or claims, the terms "comprise" and "include", along with their derivative, may be used and are intended as synonyms for each other.

The terms used herein is for the purpose of describing particular embodiments only and is not intended to be limiting of the invention. As used herein, the singular forms are intended to include the plural forms as well, unless the context clearly indicates otherwise. "Connected" may be used to indicate that two or more elements are in direct physical and/or electrical contact with each other. "Coupled" may mean that two or more elements are in direct or indirect physical and/or electrical contact with each other.

Figure 1:
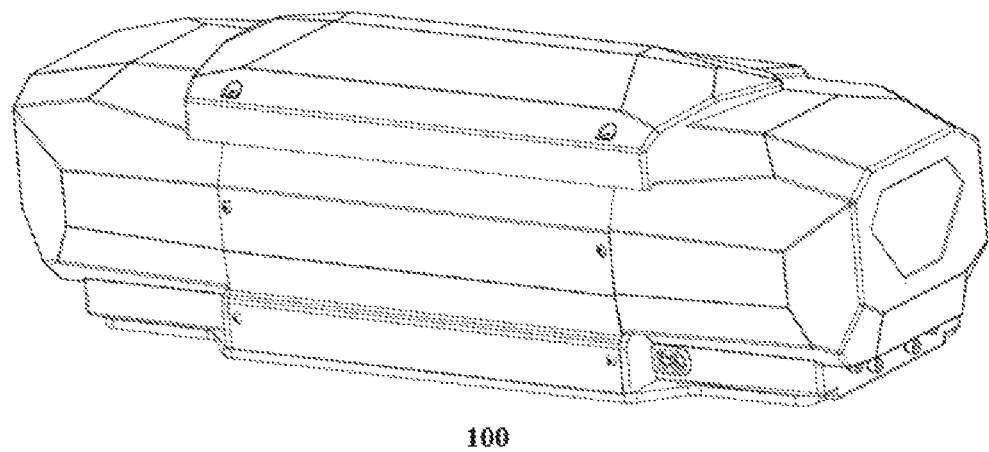
FIG. 1 is a schematic diagram of a winch in accordance with an embodiment of the present disclosure.

FIG. 1 is a schematic diagram of a winch 100 according to an embodiment of the present disclosure. Winch 100 includes a housing that covers all of its internal components. The housing is detachably mounted on the bottom plate 101 of the winch 100. The housing can prevent the internal parts of the winch 100 from being affected by harsh environmental conditions, and can also provide a visually pleasing effect. Since the winch 100 is designed to automatically retract a rope, the user need not to open the housing during operation of the winch 100. Therefore, the housing may leave only one opening through which the rope passes when closed, and stays in contact with the first side support 102, the motor support 103, the second side support 107, and the gear reduction unit support 105. Optionally, a portion of the front of the housing can comprise a movable window hinged to the housing to facilitate maintenance by the user in an event of failure.

Figure 2:
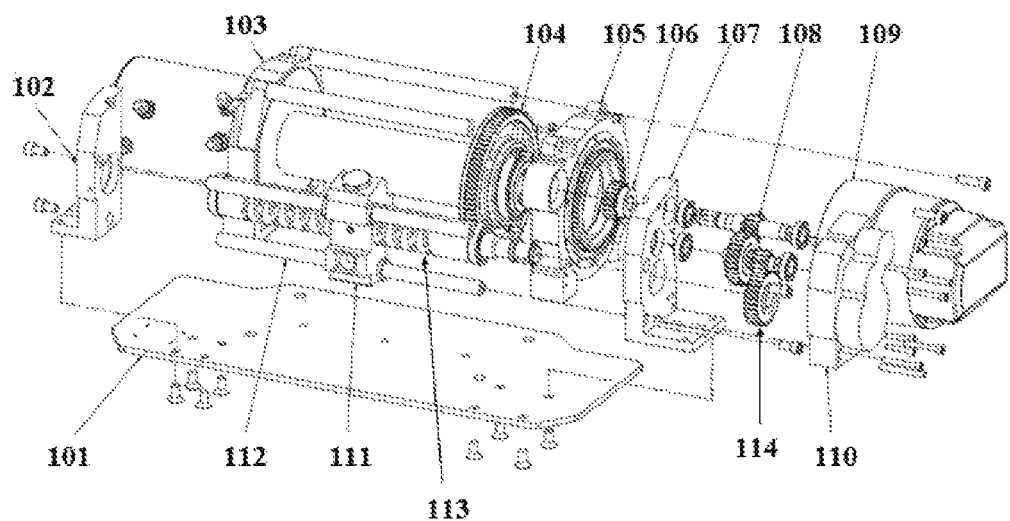
FIG. 2 is an explosive view of the inner components of a winch in accordance with an embodiment of the present disclosure.
Figure 3:
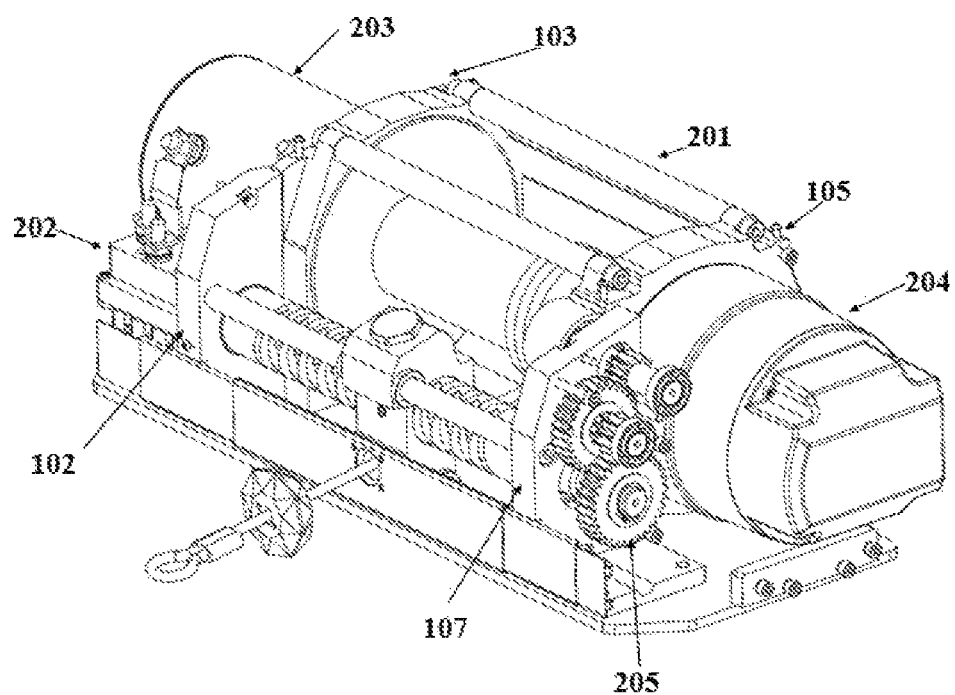
FIG. 3 is an assembled view of the inner components of a winch in accordance with an embodiment of the present disclosure.

FIG. 2 shows an exploded view of the internal components covered under the housing of the winch 100. FIG. 3 shows a schematic view of the internal components of the winch 100 after being assembled. The winch 100 includes a bottom plate 101 that together with the housing forms a closed package that includes other components. The bottom plate 101 includes a plurality of threaded holes so that the first side support 102, the motor support 103, the second side support 107 and the gear reduction unit support 105 can be fixed on the bottom plate 101 by screws. Optionally, the contact surfaces of the first side support 102 and the second side support 106 with the bottom plate 101 are both approximately of square shapes, and each is connected to four threaded holes on the bottom plate 101 through four screws. The contact surfaces of the motor support 103 and the gear reduction unit support 105 with the bottom plate 101 are both approximately of rectangular shape, and each is connected to two threaded holes on the bottom plate 101 through two screws. A motor 203 is mounted on a side of the motor support 103. The motor 203 may be any direct current motor, asynchronous motor, synchronous motor, etc., in order to provide the winch 100 with a driving force. The driving force of the motor 203 is transmitted through the driving shaft to the winding drum 201 installed between the motor support 103 and the gear reduction unit support 105, and the gear reduction unit 204 installed on the side of the gear reduction unit support 105. A control unit 202 is mounted on one side of the first side support 102. The control unit 202 is optionally a relay to provide power to the motor 203. The control unit 202 can be connected to a control device built into the vehicle via a conducting wire so that the winch 100 can be controlled from inside the vehicle. The control unit 202 may have a communication function to receive an instruction sent by a remote controller. A plurality of terminals are distributed on the side wall of the motor 203 near the control unit 202. The plurality of terminals are electrically coupled to the control unit 202 to receive voltage or current control signals from the control unit 202. The gear reduction unit 204 includes well-known gear reduction assembly components such as a winding drum gear combination 104, a gear casing 109, and a deceleration multi-stage planetary assembly 410 mounted in the gear casing 109. The multi-stage planetary gear assembly 410 included in the gear reduction unit 204 may be used to provide the winch 100 with a variety of different rotational speed modes of operation so that the winding drum 201 may operate at different rotational speeds. If a higher rotational speed is required, the first planetary gear in the multi-stage planetary gear assembly 410 can be used. If a lower rotational speed is required, other stages in the multi-stage planetary gear assembly 410 can be used.

The first side support 102 and the motor support 103 are not aligned in the direction along the axis of the winding drum 201 when mounted to the bottom plate 101. Optionally, the first side support 102 is closer to the edge near the motor 203 of the winch 100 than the motor support 103 and has a gap with the motor support 103 in the direction along the axis of the winding drum 201. Since the size of the control unit 202 is generally smaller than the size of the motor 203, the size of the gap also varies according to the size difference between the control unit 202 and the motor 203.

A transmission gear unit 205 is mounted on one side of the second side support 107. The transmission gear unit 205 includes a transmission gear 106, a gear shaft 108, a gearbox gear 114 that is in driving connection with the gear shaft 108, and a gearbox housing 110 that covers the gearbox gear 114. The transmission gear unit 205 transmits the driving force from the winding drum 201 to the gearbox gear 114 through the transmission gear 106 and the gear shaft 108 so as to drive the reciprocating screw rod 113 installed between the first side support 102 and the second side support 107 support. When the winding drum 201 rotates, it drives the reciprocating screw rod 113 to rotate clockwise or counterclockwise through the transmission gear 106, the gear shaft 108 and the gearbox gear 114. Between the first side support 102 and the second side support 107, there are two mutually parallel slider guides 112. A reciprocating screw rod slider 111 is slidably mounted on the slider guides 112. The axis of the slider guide 112 is parallel to the axis of the winding drum 201. Providing two slider guides 112 may ensure that the sliding of the reciprocating screw slider 111 is parallel to the axis of the slider guides 112. The slider guides 112 and the reciprocating screw rod 113 are installed between the first side support 102 and the second side support 107, so that the reciprocating screw rod 113 is only drivingly coupled with the winding drum 201 through the transmission gear unit 205. This configuration can reduce the effect of vibration of the motor 203 or the gear reduction unit 204 on the movement of the reciprocating screw slider 111. The reciprocating screw slider 111 is bored so that a rope wound on the winding drum 201 may pass therethrough. The reciprocating screw slider 111 slides along the slider guides 112 along with the rotation of the reciprocating screw rod 113 following the position where the rope is disengaged from or wound onto the winding drum 201. The rope will keep entering or exiting the hole in the reciprocating screw slider 111 in a direction substantially perpendicular to the winding drum 201 and the reciprocating screw rod 113. The gearbox gear 114 is also used to adjust the reciprocating screw rod 113 to an appropriate rotation speed consistent with the rotation of the winding drum 201. This configuration does not require the user to manually retract the rope, and also enables an orderly winding of the rope along the winding drum 201 to avoid cross-winding.

The second side support 107 is provided with a plurality of through holes respectively corresponding to the transmission gear 106, the gear shaft 108, and the gearbox gear 114. The second side support 107 and the gear reduction unit support 105 are not aligned along the winding drum 201 when mounted to the bottom plate 101. Optionally, the second side support 107 is closer to the edge near the side of the gear reduction unit 204 of the winch 100 than the gear reduction unit support 105. Therefore, the distance between the first side support 102 and the second side support 107 is greater than the distance between the motor support 103 and the gear reduction unit support 105. Since the cross-sectional area of the motor support 103 is generally larger than the cross-sectional area of the motor 203, and the cross-sectional area of the gear reduction unit support 105 is generally larger than the cross-sectional area of the gear box 109, the first side support 102 and the second side support 107 are respectively separated from the motor support 103 and the gear reduction unit support 105 to make use of the free space created by the motor support 103 and the gear reduction unit support 105. The control unit 202 is generally small in size in the case of a relay and may be disposed in a space the motor 203 and the first side support 102 created. The gears in the gearbox gear 114 are designed to engage with each other in the longitudinal direction of the second side support 107 so as to be received in the space created by the second side support 107 and the gear box 109. This configuration allows the overall size of the winch 100 to be reduced. Similarly, a gap may also be provided between the second side support 107 and the gear reduction unit support 105. The gear shaft 108 and the gearbox gear 114 are designed to be housed within an enclosed space defined by the second side support 107 and the gearbox housing 110, protected from dust and water. Optionally, a sealing ring may also be provided between the second side support 107 and the gearbox housing 110 to enhance the sealing effect.

Figure 4:
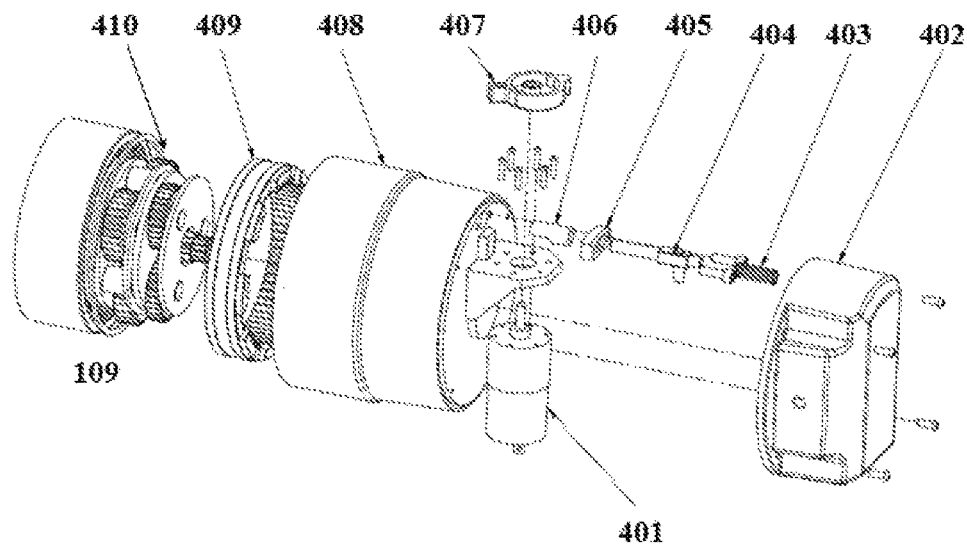
FIG. 4 is an exploded view of a gear reduction unit of a winch in accordance with an embodiment of the present disclosure.
Figure 5:
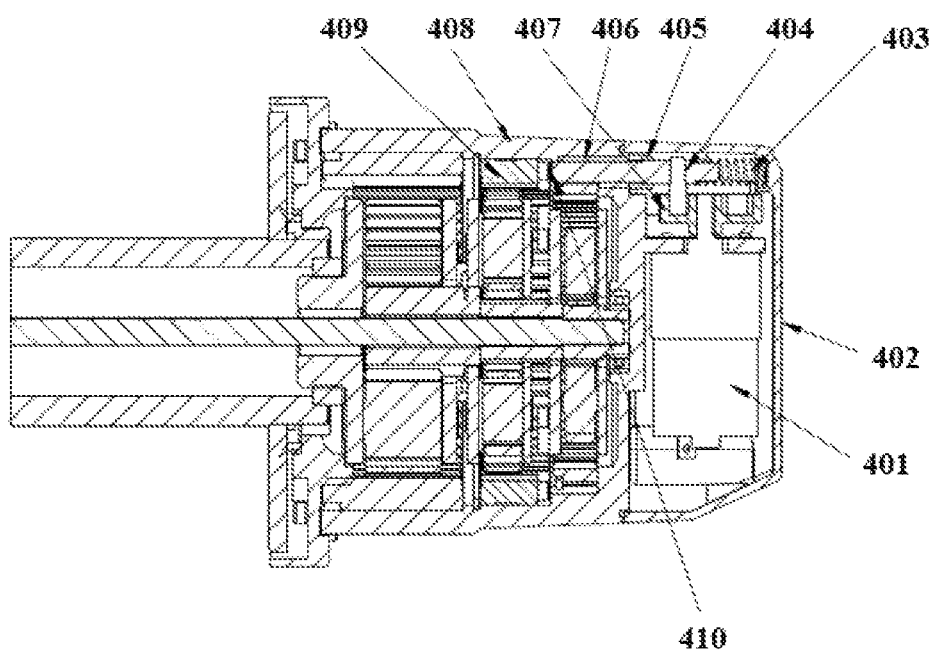
FIG. 5 is a cross-sectional view of a gear reduction unit of a winch according to an embodiment of the present disclosure.
Figure 6:
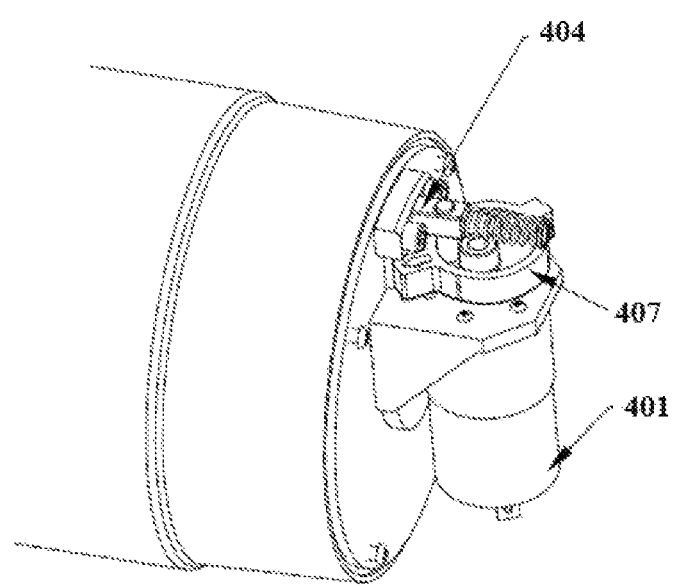
FIG. 6 is a schematic view of an automatic clutch unit of a winch in accordance with an embodiment of the present disclosure.
Figure 7:
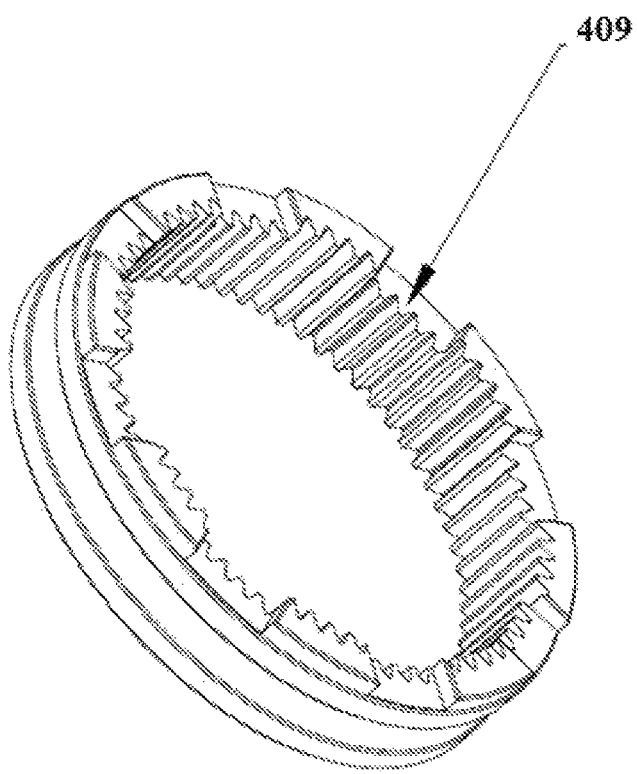
FIG. 7 is a schematic view of a movable ring gear of a winch in accordance with an embodiment of the present disclosure.

FIGS. 4-6 show the gear reduction unit 204 and the automatic clutch unit in more detail from various perspectives. The automatic clutch unit includes a movable ring gear 409 that engages with the planetary gear assembly 410 of the gear reduction unit 204. The movable ring gear 409 includes, as shown in FIG. 7, a plurality of gaps having equal intervals in the circumferential direction. The inner surface of the movable ring gear 409 comprises gear teeth to engage the planet gears in the planetary gear assembly 410. The automatic clutch unit further includes a DC gear motor 401, a cam 407 mounted on a drive shaft of the DC gear motor 401 and driven by the DC gear motor 401 to rotate, and a pull rod 404 pushed by the cam 407. The pull rod 404 includes a protrusion that contacts the cam 407. As the protrusion rotates along with the cam 407, the pull rod 404 would be driven to enter or exit the movable ring gear 409.

A first end of the pull rod 404 near the movable ring gear 409 is optionally inserted into a pull rod guide sleeve 406, and the pull rod guide sleeve 406 is inserted into a pull rod positioning block 405, which can be used to avoid deviation of the direction of movement of the pull rod 404. The first end of the pull rod 404 can be inserted into any one of the notches of the movable ring gear 409, while the spring 403 at the other end of the pull rod 404, i.e., the second end, provides an elastic force pointing to the first end so that the first end of the pull rod 404 remains inserted in the notch. The spring 403 can be held in a compressed state with one end fixed to the gearbox cover 402 and the other end connected to the second end of the pull rod 404. The central portion of the rod 404 is formed with a limiting structure having a rectangular cross-section with a larger cross-sectional area than that of the second end for limiting the position of the spring 403. As the winch 100 is in an operating state, the driving force of the motor 203 is transmitted to the movable ring gear 409 through the pulling rod 404, then the planetary gear assembly 410 of the gear reduction unit 204 is driven to rotate, and then the winding drum 201 is driven to rotate by the planetary gear assembly 410.

When the first end of the pull rod 404 is pushed by the cam 407 to disengage from the movable ring gear 409, the winch 100 would be in a clutched state. At this state, the driving force of the motor 203 cannot be transmitted to the movable ring gear 409 or the planetary gear assembly 410 of the gear reduction unit 204, so the motor 203 becomes idle. The winding drum 201 is no longer driven and will stop rotating thereafter. Frequent switching of the winch 100 between the clutch state and the operating state can be achieved simply by adjusting the position of the pull rod 404 without having to repeatedly shut down or restart the motor 203.

The DC gear motor 401 and the cam 407 are located in a closed space formed by the gearbox cover 402 and the gearbox housing 408. The gearbox cover 402 may be connected to the gearbox housing 408 by a screw. In this way, only one rod access port needs to be left on the gear box 408 so that the pull rod 404 enters or exits the movable ring gear 409 in the gear box 408 through the pull rod guide sleeve 406 and the pull rod positioning block 405. In this way, the planetary gear assembly 410 of the gear reduction unit 204 and the automatic clutch unit are separated from each other to avoid mutual interference. Further, the size of the pull rod access port is adapted to the cross-section of the pull rod 404, which prevents dust or water from entering the interior of the gear box housing 408 and contaminating the planetary gear assembly 410. The DC gear motor 401 may be driven to rotate clockwise or counter-clockwise so that the pull rod 404 enters or exits the notch respectively. After the cam 407 rotates to the limit position, the current of the DC gear motor 401 will start increasing and become overloaded, and subsequently the DC gear motor 401 will be powered off and cease rotating. A function of an automatic stopping of rotation is thus realized.

In an event of an emergency requiring the stop of the winch 100, it is only necessary to drive the cam 407 to push the pull rod 404 to move a small amount of displacement that is sufficient to disengage from the movable ring gear 409. Then, the winding drum 201 would lose its driving force without needing to interfere with the gear reduction unit 204 or the motor 203. This configuration helps to protect the other components such as the gear reduction unit 204 from damage in an emergency stop of the winch. In one embodiment, the DC gear motor 401 is connected to the control unit 202 through a conducting wire. The control unit 202 provides DC power to the DC gear motor 401 and controls the rotation of the DC gear motor 401 according to a user's control command. In one embodiment, the DC gear motor 401 is independently powered by its own batteries, and the user can control the rotation of the DC gear motor 401 through an additional switch or a remote control device. The rotation speed and torque of the DC gear motor 401 can be determined according to the magnitude of friction between the pull rod 404 and the movable ring gear 409.

Although certain embodiments have been illustrated and described herein for purposes of description, a wide variety of alternate and/or equivalent embodiments or implementations to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

I claim:

1. An automatic clutch winch, comprising:
   a motor;
   a gear reduction unit actuated by the motor; and
   a winding drum drivably coupled with the gear reduction unit, wherein
   the gear reduction unit comprises a planetary gear assembly drivably coupled with the winding drum, a movable ring gear engaging with the planetary gear assembly, a direct current (DC) gear motor, a cam driven by the DC gear motor to rotate, and a pull rod driven by the cam, and wherein the pull rod is driven by the cam on a first end to enter or exit a notch of a plurality of notches in the movable ring gear, and the movable ring gear is drivingly coupled with the motor when the first end enters the notch, and decoupled from the motor when the first end exits the notch.

2. The winch of claim 1, wherein the pull rod is connected to a spring at a second end of the pull rod opposite the first end, the spring providing an elastic force for retaining the first end in the notch when the first end enters the notch in the movable ring gear.

3. The winch of claim 2, wherein the pull rod includes a protrusion that contacts the cam.

4. The winch of claim 3, wherein the movable ring gear includes a plurality of notches having the same pitch in the circumferential direction.

5. The winch of claim 4, wherein the movable ring gear and said planetary gear assembly are mounted within a gearbox housing, the gearbox housing including a pull rod access port for the pull rod to enter or exit the movable ring gear.

6. The winch of claim 5, wherein the DC gear motor is mounted outside the gearbox housing.

7. The winch of claim 6, further comprising a gearbox cover for receiving the DC gear motor.

8. The winch of claim 7, further comprising a control unit disposed on a side of the motor and electrically coupled with the motor.

9. The winch of claim 8, wherein the DC gear motor is electrically coupled to the control unit.

10. The winch of claim 9, wherein the motor is mounted on a motor support, the gear reduction unit is mounted on a gear reduction unit support symmetrical to the motor support, and the winding drum is mounted between the motor support and the gear reduction unit support.

* * * * *